Aug. 30, 1966 L. G. HILL 3,269,515
FRUIT PROCESSING APPARATUS
Filed Jan. 21, 1965 6 Sheets-Sheet 1

FIG_1

INVENTOR
LINDSAY GREIG HILL
BY Hans G. Hoffmeister.
ATTORNEY

United States Patent Office 3,269,515
Patented August 30, 1966

3,269,515
FRUIT PROCESSING APPARATUS
Lindsay Greig Hill, Melbourne, Victoria, Australia, assignor to FMC Corporation, San Jose, Calif., a corporation of Delaware
Filed Jan. 21, 1965, Ser. No. 426,876
9 Claims. (Cl. 198—33)

This invention relates to fruit processing apparatus and more particularly concerns an improved mechanism for transferring fruit from a feed conveyor to a fruit processing machine.

In the processing of fruit that has pits it is often necessary to manipulate the fruit so that it is oriented in a predetermined position in which the fruit can be operated on without interference from the pit. For example in one type of pitting machine the entrance of the machine is defined by two spaced vertically aligned blades which are adapted to substantially bisect the flesh of the peach by cutting into the peach on opposite sides of the pit. In order that the cuts be made as deep as possible, it is desirable that the elongated pit of each peach be oriented so that its longitudinal axis is generally parallel to the cutting edges of the blades while the peach is being impaled on the blades. Since peaches are usually subjected to preliminary orientation and alignment operations that dispose the suture plane of each peach in a predetermined vertical position and orient the peach with its stem indent facing downwardly, it becomes necessary to remove each peach from the orienting mechanism and transfer it to the blades while shifting the axis from its vertically oriented position to the above-mentioned desired position generally parallel to the edges of the blades of the pitter.

Accordingly, it is an object of the present invention to provide an improved apparatus for transferring fruit from a conveyor to a fruit processing machine.

Another object is to provide a transfer mechanism capable of receiving a fruit whose axis has a predetermined orientation and transferring it to a fruit processing machine while changing the position of the axis to a second, desired orientation.

Another object is to provide a novel cam system for controlling the movement of gripper members of a fruit transfer mechanism.

Other and further objects and advantages of the present invention will be apparent from the following description taken in connection with the accompanying drawings in which.

Figure 1:
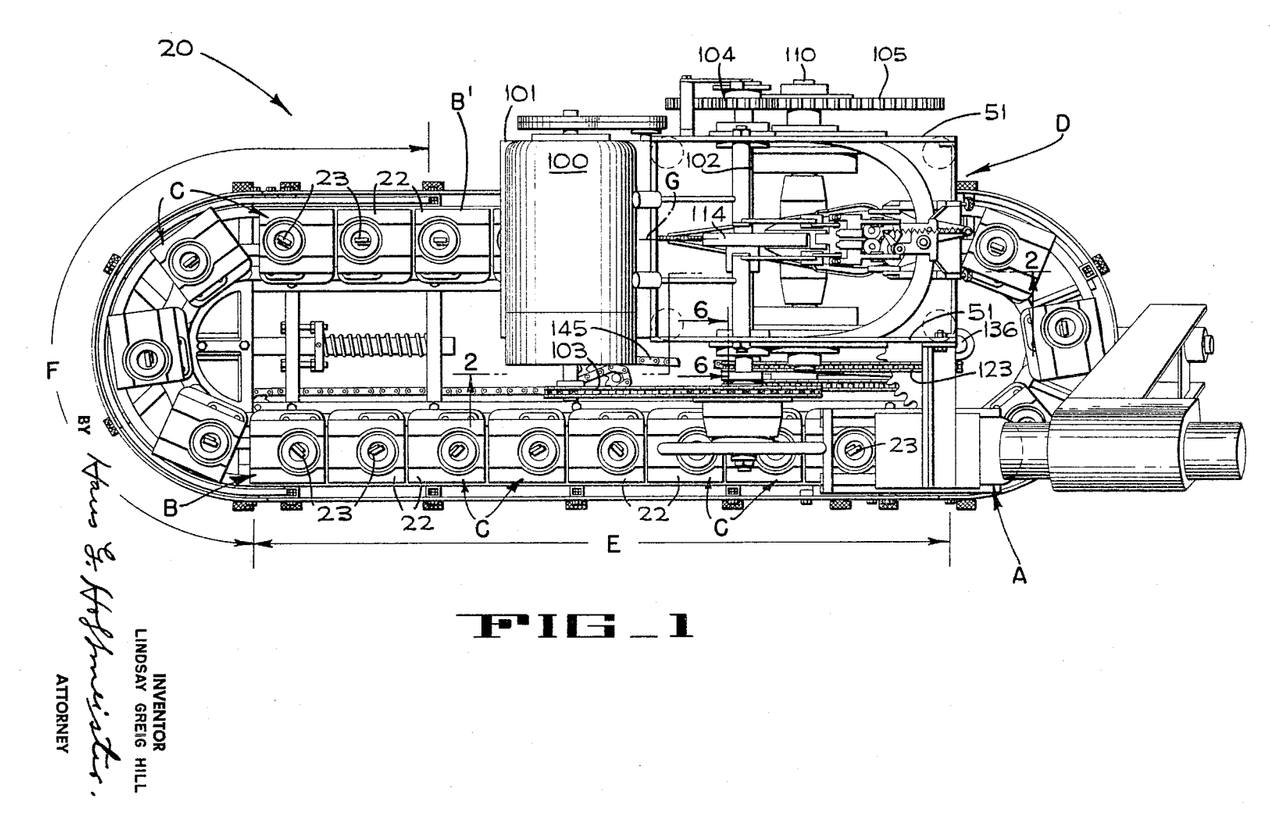
FIGURE 1 is a more or less diagrammatic plan of a fruit processing machine incorporating the fruit transferring mechanism of the present invention.
Figure 2:
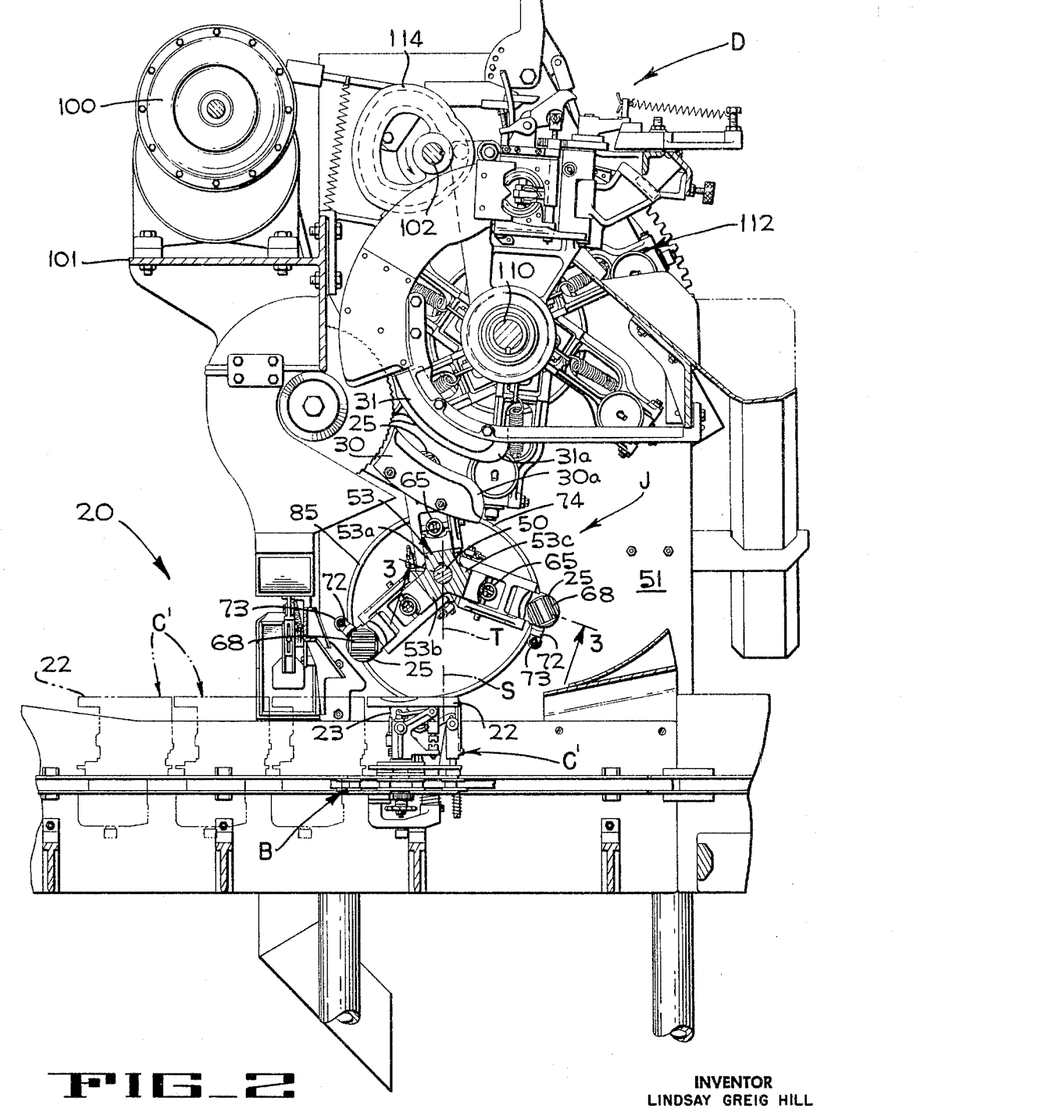
FIGURE 2 is an enlarged vertical section taken along line 2—2 of FIGURE 1.

In FIGURES 1 and 2 a machine 20 for feeding, orienting, aligning, and pitting peaches is illustrated. This machine is described in detail in the application of David Elford entitled Fruit Handling Machine and filed of even date herewith. The Elford application is assigned to the assignee of the present application and the disclosure of said Elford application is incorporated by reference herein. However, the present invention concerns only a novel fruit transfer mechanism that is adapted for use in the machine of the Elford application, and this transfer mechanism is completely disclosed in the present specification.

In general, the machine 20 comprises a fruit feeding mechanism A that delivers peaches one at a time in the carriages C of an endless chain type carriage conveyor B. Each carriage includes a vertically movable centering ring 22 (FIGURE 2) which supports the peach and a finder wheel 23 that engages the underside of the peach in the ring. The wheel 23 is rotated while the carriage moves along zone E so that the peach is continuously rotated until the finder wheel becomes lodged in the stem indent at one end of the peach. When this occurs the peach is oriented with its stem axis in vertical position. The finder wheel 23 is also oscillated about a vertical axis while in zone E and while moving through zone F. This oscillating movement of the wheel causes the plane of the wheel to become aligned with the suture plane of the peach so that, by the time the end of zone F is reached, the peach is usually oriented with its axis vertical and aligned so that its suture plane is in a vertical plane G extending longitudinally of the run B′ of the carriage conveyor B that leads to the transfer mechanism J of the present invention.

The peach is held in the oriented and aligned position as it approaches a transfer station S and, as the carriage approaches this station, the centering ring of the carriage is lowered to the position shown by carriage C′ in FIGURE 2. In this position, the centering ring is below the path of movement of gripper members 25 of the transfer mechanism J, and the oriented peach is in position to be effectively engaged by the gripper members.

As will be explained in more detail presently, the transfer mechanism rotates counterclockwise (FIG. 2) and is adapted to remove each peach from a carriage of the conveyor B, and impale it on two spaced vertical blades 30 and 31 that are mounted in fixed position in a pitting unit D.

Figure 3:
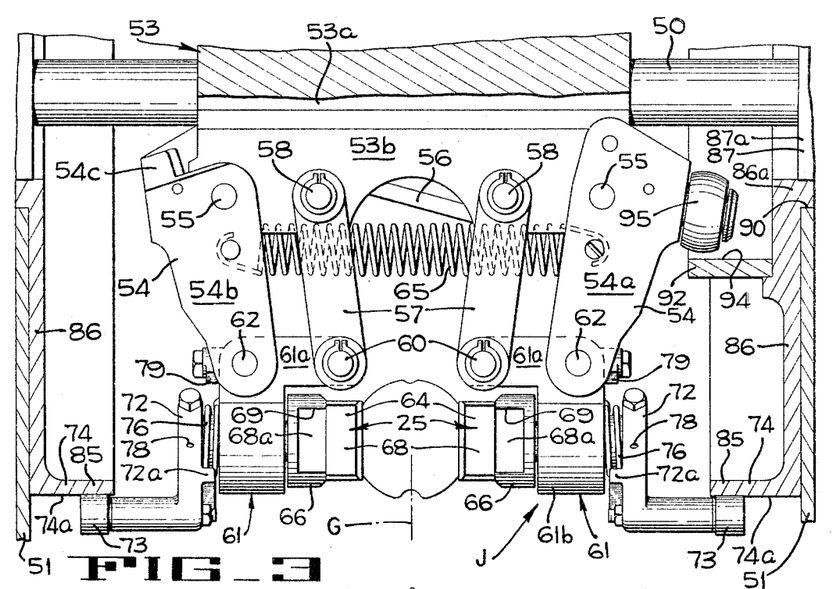
FIGURE 3 is an enlarged vertical section taken along line 3—3 of FIGURE 2 but showing the mechanism in a different operating position from that indicated by line 3—3.

The transfer mechanism J comprises a shaft 50 (FIG. 2) that is journalled for rotation in spaced side walls 51 (FIG. 3) of the pitter unit D. A mounting member 53 is keyed to shaft 50 and is provided with three equi-angularly spaced, radially projecting flanges 53a, 53b and 53c. As seen in FIGURE 3, each flange is an elongate member which has a U-shaped lever 54 at each end pivotally mounted on a pair of aligned pins 55 that project from opposite sides of the flange. The two levers 54 are identical, each lever including a pair of side plates 54a and 54b (FIG. 5) connected by an integral end wall 54c. A link 56 (FIG. 4) is pivotally connected to the side plate 54a of one lever and the side plate 54b of the other lever so that the levers swing simultaneously. Also, it should be noted that, since the link is connected to one lever on the opposite side of a line passing through the two pivot pins 55 from the side on which it is connected to the other lever, the levers swing alternately toward and away from each other.

Figure 4:
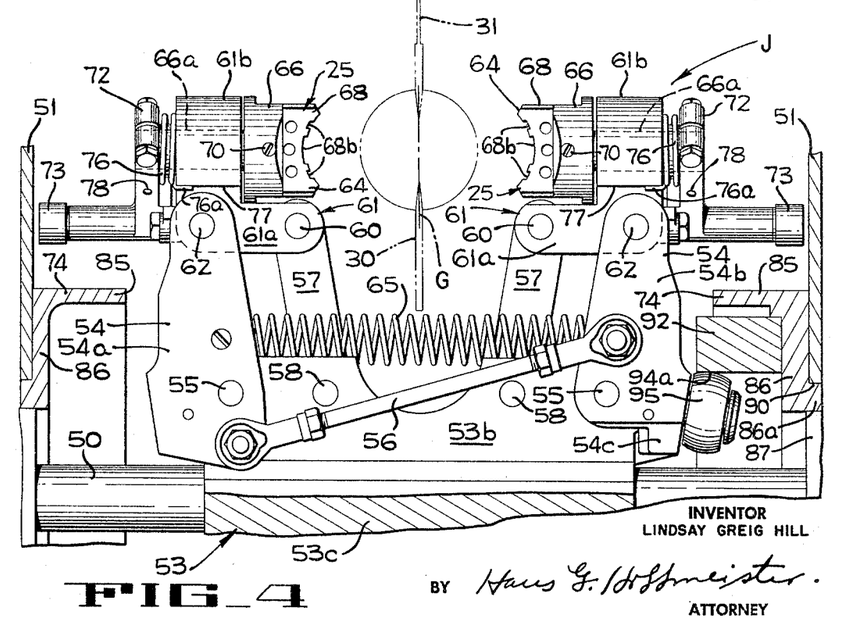
FIGURE 4 is a section similar to FIGURE 3 but showing the jaws in peach-releasing position.

A pair of links 57 (FIG. 3) are pivotally mounted on pins 58 projecting from each flange. At its opposite end, each link 57 is pivoted on a pin 60 projecting from a block 61a of a gripper mounting member 61. A second pin 62, projecting from block 61a, pivotally mounts the adjacent U-shaped lever 54. The pins 55, 58, 60 and 62 are so located that each link 57 and its associated lever 54 form a parallelogram linkage which assures straight-line movement of a peach gripper head 64 carried by the mounting member 61 as the two opposed levers 54 are urged toward each other by a spring 65 that is connected between the levers. Each head includes a holder 66 having a cylindrical stub shaft 66a rotatably supported in a hub 61b of the mounting member 61, the axis of shaft 66a being parallel to a line connecting pivot pins 62 and 60. A gripper element 68 has a generally square extension 68a that fits into a deep groove 69 in the holder 66 and is locked therein by a setscrew 70. The gripper element is made of a resilient material such as neoprene and has a plurality of elongate grooves 68b formed therein. The shaft 66a projects through the hub 61b and has one end of a lever 72 clamped thereon. The other end of lever 72 carries a rotatable cam follower roller 73 which is arranged to ride along the surface 74a of a cam 74, being urged against the surface 74a by a torsion spring 76. As seen in FIGURE 4, each spring 76 has an end portion 76a (FIG. 5) disposed in a notch 77 in the hub 61b, and an end portion 76b engaged in a hole 78 in the lever 72. At a particular section of the cam, the cam surface 74a is so designed that the follower 73 moves out of engagement with the surface. When this happens the torsion spring 76 continues the rotation of the lever until an abutment member 72a on the lever engages a stop member 79 on the hub 61.

Figures 7, 8, 9, 10:
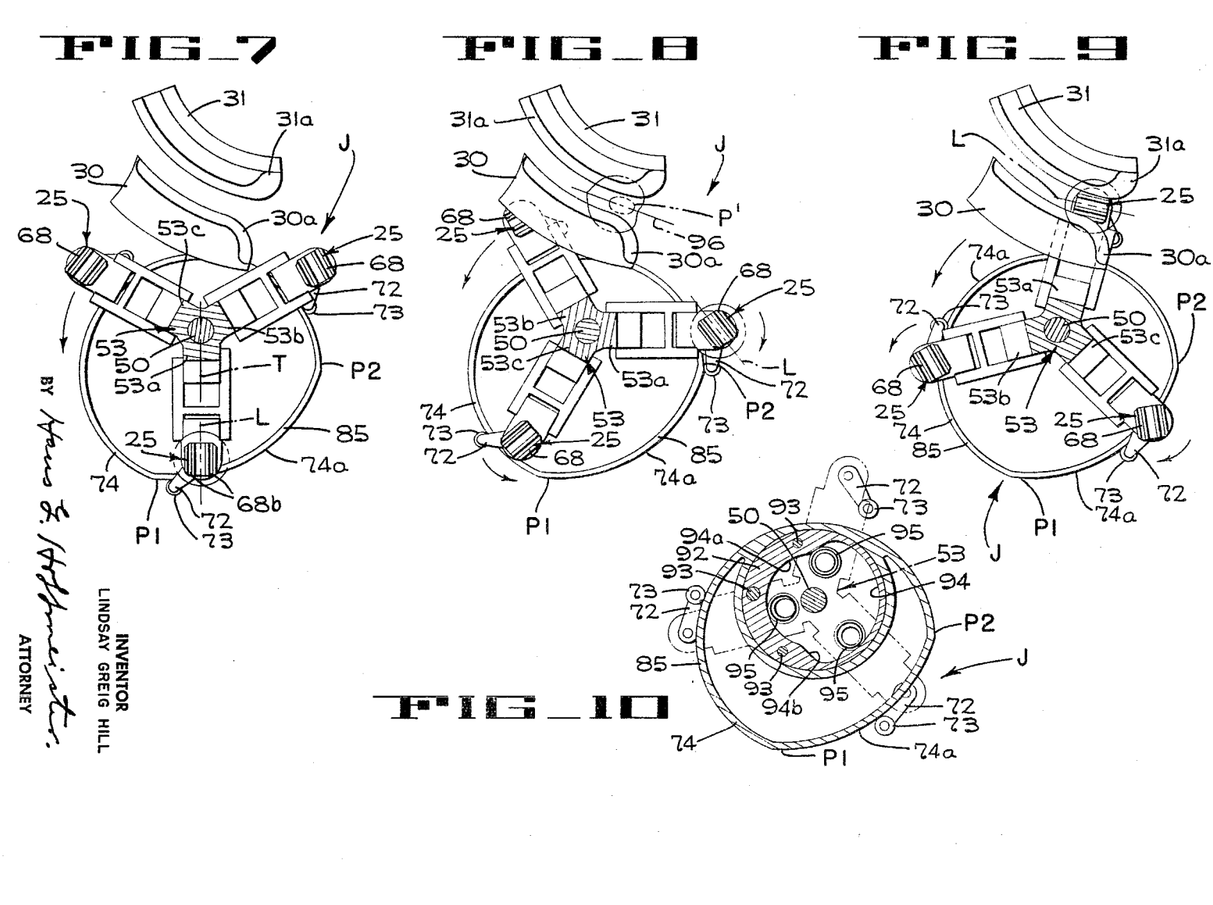
FIGURES 7, 8 and 9 are a series of diagrammatic operational views of the transfer mechanism and the cam that causes rotation of the gripper elements of the transfer mechanism.
FIGURE 10 is a reduced section taken along lines 10—10 of FIGURE 6.

Referring to FIGURE 10 wherein the mounting member 53 and part of the structure is shown in phantom lines so that the cams and associated followers are emphasized, it will be seen that each torsion spring urges the levers 72 inwardly, clockwise in FIGURE 10, to move the rollers 73 toward contact with the cam surface 74a. The cam surface 74a is formed on a flange 85 (FIG. 6) that projects outwardly from a plate 86. The plate 86 has a cylindrical opening which receives a cylindrical portion 87a of a bearing unit 87, the unit 87 being secured to the plate 86 by capscrews 88. The adjacent side plate 51 of the pitter unit D has an opening 90 which receives an annular flange 86a on the cam plate 86. The area of the side plate 51 that is around the opening 90, is disposed between the cam plate and an enlarged annular flange 87b of the bearing unit 87. Thus, the cam plate 86 is effectively locked on the side plate of the pitter.

Before the cam plate 86 is locked on the side plate of the pitter, an inner cam 92 is bolted to the plate 86 by means of a plurality of capscrews 93. The inner cam has an internal camming surface 94 along which three rollers 95 ride. Each roller 95 (FIG. 5) is rotatably mounted on the end plate 54c of one of the levers 54. Accordingly, as seen in FIGURE 10, when the gripper mounting member 53 is rotated counterclockwise (FIG. 10) the torsion springs 76 associated with levers 72 urge the rollers 73 toward engagement with the exterior cam surface 74a, and the follower rollers 95 on levers 54 ride along the inner cam surface 94.

Referring to FIGURE 2 it will be noted that, as the flanges 53a, 53b and 53c of the transfer mechanism J rotate counterclockwise and the carriage C moves toward the right, they pass through the transfer station S which includes a vertical plane T that passes through the axis of shaft 50. It is at this station that opposed gripping elements move inwardly toward each other to grip a peach being conveyed by the carriage C. As each arm, as for example arm 53b (FIG. 2) approaches the plane T, the roller follower 95 (FIG. 10) associated with the arm is riding along a camming surface 94a that is relatively close to the center of cam 92 and therefore is adapted to hold the levers 53 in the pivoted position shown in FIGURE 4. Accordingly, as the arm 53b approaches plane T, the gripping elements 68 are held in open position. Just before the arm reaches plane T, the follower roller engages an inclined camming surface 94b which allows the spring 65 to swing the levers 54 inwardly, moving the gripper elements into contact with a peach in the carriage C, substantially as shown in FIGURE 3.

Referring to FIGURE 7, it will be noted that when the gripper elements 68 of each arm pass through the radial, vertical plane T, the axis of the peach, which is indicated by phantom line L, is disposed in this plane. Also, it should be noted that the grooves 68b of each gripping element are parallel to plane T, being held in this parallel position due to the fact that the associated lever 72 is held in a particular angular position by the follower roller 73 riding along the cam surface 74a. As the gripping elements move away from the transfer station, they lift the peach out of the carriage C and swing it upwardly toward the entrance of the pitting mechanism D which is defined by the two spaced vertical blades 30 and 31 that have sharpened edges 30a and 31a, respectively, extending along their front edges and along their confronting side edges. Referring to FIGURE 8 it will be noted that when a peach is impaled on the blades 30 and 31, which are in a vertical plane aligned with the suture plane of each peach that has been correctly aligned and oriented, the pit P' must be disposed with its axis 96 oriented generally parallel to the cutting edges 30a and 31a so that the edges will cut close to the side edges of the pit. To attain this re-orientation of the peach, it must be rotated approximately 90° about the axis of the gripper element. This rotation of the peach is carried out by the torsion springs 76 that are connected to the gripper elements and are arranged to urge each roller follower 73 into contact with the cam surface 74a. The cam surface 74a is farthest from the shaft 50 at a point P1 on the periphery of the cam just ahead of the plane T. Proceeding counterclockwise around the cam, it will be seen that the cam surface 74a is disposed progressively closer to the shaft 50. Accordingly, the lever 72 and the gripper element mounted thereon are rotated clockwise about their own axis as the associated follower 73 moves along this surface. At point P2 the cam surface 74a moves in toward the shaft 50 at a greater rate so that the lever 72 is quickly pivoted to the position at which the abutment member 72a on the lever engages the stop 79 on the fixed hub 61. Since the lever can pivot no further, it is the engagement of the abutment member 72a with the stop 79 that determines the orientation of the peach and its pit as the peach is moved onto the blades 30 and 31. After the peach is deposited on the blades, the follower roller 73 rides along a portion of the cam surface 74a that progressively moves away from the shaft 50 and, accordingly, the lever 72 is pivoted in an opposite direction as the roller moves toward the point P1.

Figure 11:
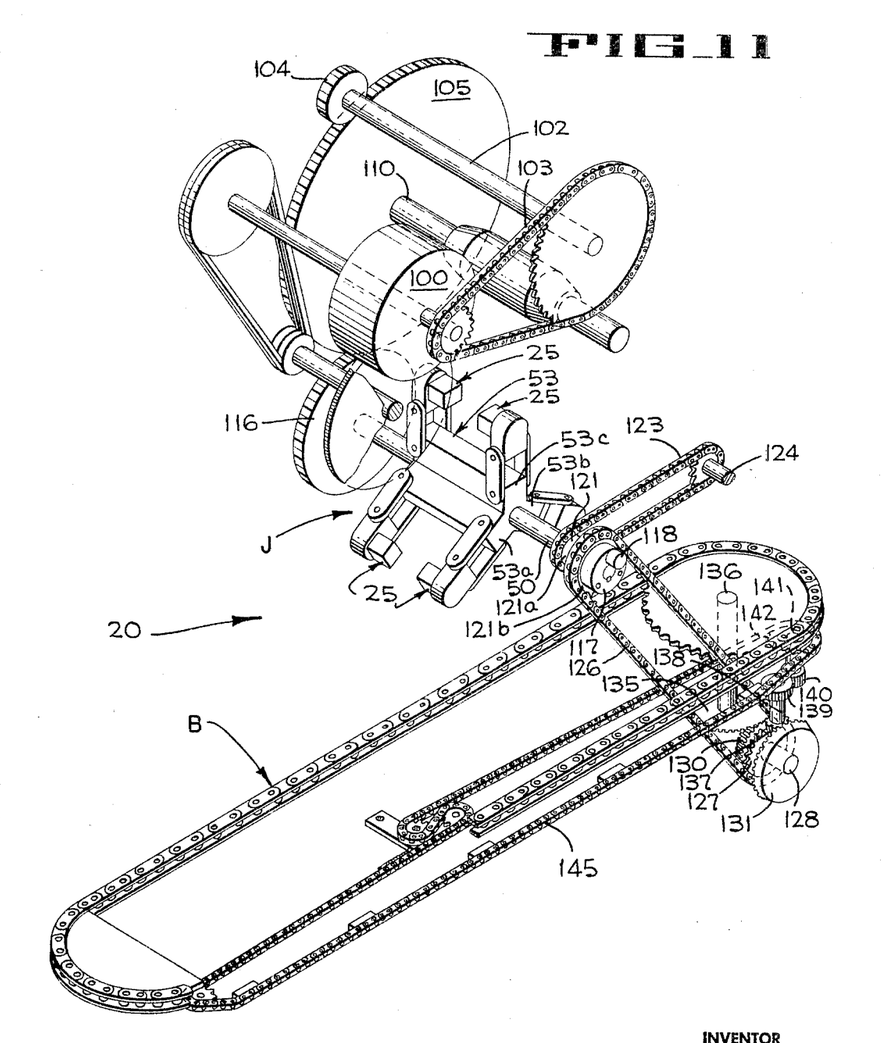
FIGURE 11 is a schematic perspective of the drive mechanism for the transfer mechanism.

A motor 100 (FIG. 1), that is mounted on a bracket 101 secured to the pitter D, drives all of the powered mechanisms of the machine 20 including the transfer mechanism J. As seen in FIGURES 1, 2 and 11, the motor 100 drives a shaft 102 of the pitter D by means of the chain and sprocket drive 103. A small gear 104 that is keyed to shaft 102 is in mesh with a large gear 105 that is keyed to a second shaft 110 which is the main drive shaft of a fruit positioning mechanism 112 (FIG. 2) of the pitter. Thus, this mechanism 112 is driven by the motor 100 in timed relation with a cam 114 that is keyed to shaft 102 and controls the forward and rearward movement of the pitting head of the pitter.

The transfer mechanism J, which removes fruit from the carriage conveyor and delivers it to the blades at the entrance of the pitter, is driven from motor 100 due to the fact that the large gear 105 meshes with a gear 116 that is keyed to the main shaft 50 of the transfer mechanism.

Figures 5, 6:
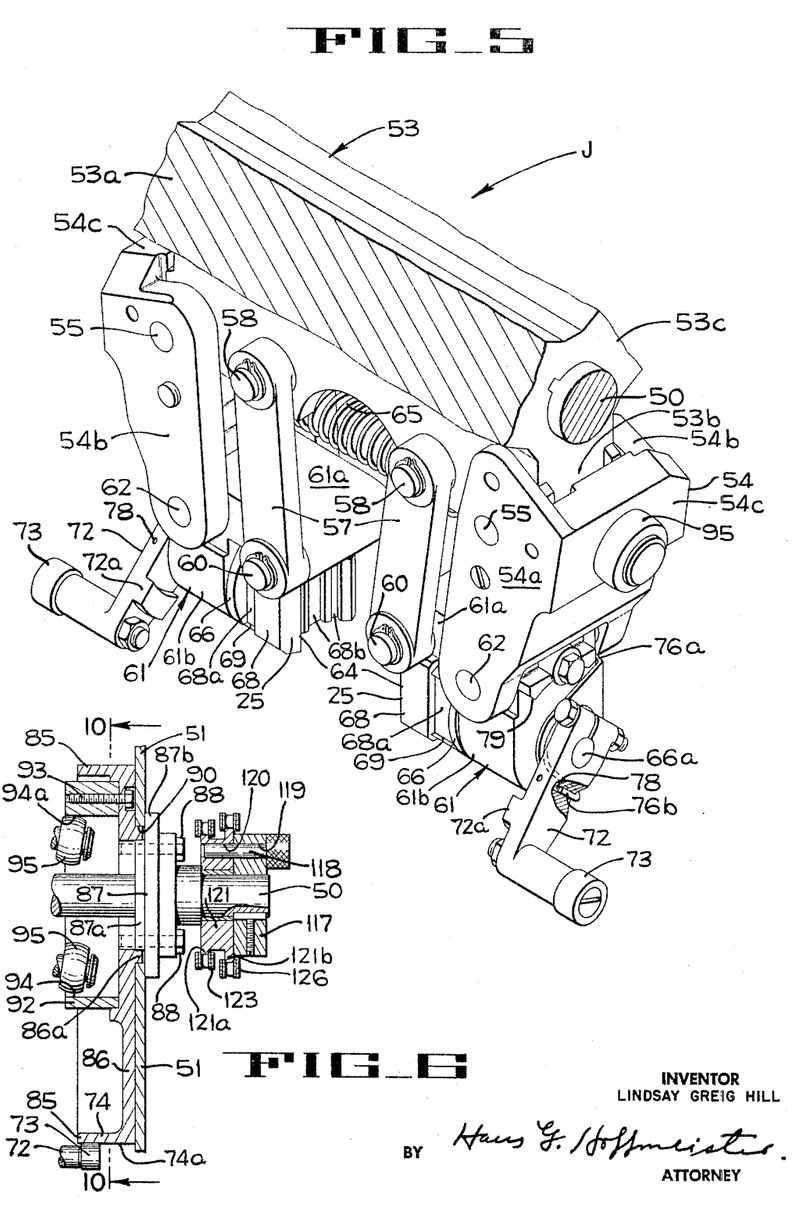
FIGURE 5 is an enlarged fragmentary perspective of a portion of the fruit transfer mechanism of the present invention.
FIGURE 6 is an enlarged fragmentary section taken along line 6—6 of FIGURE 1.

As seen in FIGURE 6, shaft 50 extends through the bearing 87 and has an end portion on which a collar 117 is keyed. A pin 118 is slidably disposed in a hole 119 in collar 117 and in a hole 120 in a double sprocket 121 that is journalled for free rotation on the end portion of the shaft 50. One wheel 121a (FIG. 11) of sprocket 121 is connected through a chain 123 to a shaft 124 which controls the operation of the feed mechanism A. The other wheel 121b (FIG. 11) of the sprocket 121 receives a chain 126 that is trained around a sprocket 127 which is keyed to a shaft 128. Two bevel gears 130 and 131 are also keyed to shaft 128, bevel gear 130 being in mesh with a bevel gear 135 that is keyed to a drive shaft 136 of the carriage conveyor B. Bevel gear 131 is in mesh with a bevel gear 137 that is keyed to a vertical shaft 138 on which a gear 139 is keyed. Gear 139 meshes with a gear 140 that is keyed to a shaft 141 that carries the drive sprocket 142 of a finder wheel-rotating chain 145. Accordingly, the carriages on conveyor B are advanced in timed relation with the actuation of the gates of the feeder A and in timed relation with the movement of the gripper members on the transfer mechanism J.

Referring to FIGURE 2 it will be seen that during operation of the machine the carriages C are advanced toward the transfer station S in timed relation with the rotary movement of the grippers of the transfer mechanism. When a peach reaches station S, a pair of grippers 68 are disposed on opposite sides of the peach and permitted by the inner cam 92 to be moved inwardly by the associated spring 65 into gripping engagement with the peach. Then as the peach is carried counterclockwise (FIGS. 7-9), the outer cam surface 74a permits the torsion springs to rotate the gripper elements until the abutment members 72a engage the stops 79. When the stops 79 have been engaged, the pit of the peach is properly oriented for movement into the space defined by the edges of the blades 30 and 31. Since the gripper elements 68 have been rotated approximately 90° about their axes, the axis of the pit will be substantially tangent to a circle about the axis of shaft 50.

The use of the two cams 92 and 74 to control the opening and closing of the grippers and the rotation of the grippers about their axes provides a simple, accurate means for coordinating the two movements of the grippers that are necessary to effectively transfer peaches from the carriages C to the blades of the pitter.

While a particular embodiment of the present invention has been shown and described, it will be understood that the apparatus is capable of variation without departing from the principles of the invention, and that the scope of the invention should be limited only by the scope and proper interpretation of the claims appended hereto.

I claim:

1. Apparatus for transferring fruit from a conveyor to an elevated processing machine, comprising a turret rotatable about a horizontal axis, a pair of gripper support members pivotally mounted on said turrent for pivoting movement in a plane generally parallel to said axis, a gripper head mounted in the end of each support member for rotation about an axis parallel to said horizontal axis, the head on each arm being disposed opposite a gripper head on the other arm, first actuating means for swinging said arms toward each other at a first angular position of said turret during rotation thereof to cause said gripper heads to close on and grip a fruit on the conveyor, second actuating means for swinging said arms away from each other to separate said gripper head at a second angular position of said turret, and third actuating means for rotating each gripper head about said parallel axis through a predetermined angular distance during movement of said turret between said first and second angular positions.

2. Apparatus according to claim 1 wherein said first actuating means comprises a spring connected between said arms.

3. Apparatus according to claim 1 wherein said second actuating means comprises a link connected between said arms, a cam follower connected to one of said arms, and a fixed cam track adjacent the path of movement of said follower and arranged to be engaged thereby.

4. Apparatus according to claim 1 wherein said third actuating means comprises a lever connected to each gripper head, a cam follower on said lever, a cam mounted in fixed position adjacent the path of movement of said follower and arranged to be engaged thereby as said turret moves between said first and second angular positions, and a spring operatively connected to said follower to urge it into engagement with said cam.

5. Apparatus for transferring fruit from a conveyor to a fruit processing machine comprising a mounting member rotatable about a horizontal axis and having a plurality of radially extending flanges, means for rotating said mounting member, a pair of gripper support members pivotally mounted on each flange, each support member including a pair of arms pivoted on the associated flange, a gripper head mounting member pivoted to the end of each of said arms to form a parallogram linkage, a shaft journalled in each mounting member, a gripper head secured to each shaft, the gripper head on one support member being in alignment with and confronting the gripper head of the other support member of the pair of support members mounted on a particular flange, a lever secured to each shaft, a cam follower mounted on each lever, a fixed cam adjacent the path of movement of said follower, a spring connected between each mounting member and the associated lever and arranged to pivot said lever in a direction to urge said cam follower against said cam, interengaging stop members on said lever and on said mounting member for limiting the pivoting movement of said lever under the urging of said spring, means operatively connected to one arm of each pair of arms for causing said parallelogram linkages to move toward each other or away from each other, spring means connected between said parallelogram linkages for moving said linkages toward each other at a first angular position of said rotatable mounting member to cause the associated gripper heads to close on and grip a fruit on the conveyor, and cam means for moving said linkages away from each other at a second angular position of said mounting member to release the fruit, said fixed cam being arranged to hold the associated gripper head at a first rotated position when said mounting member is at said first angular position and to permit said spring to move said gripper head to a second rotated position when said mounting member is at said second angular position.

6. Apparatus for transferring fruit from a conveyor to an elevated processing machine comprising a mounting member rotatable about a horizontal axis and having a plurality of radially projecting flanges, a pair of gripper support arms pivotally mounted on each flange, a rotatable fruit gripping head mounted at the outer end of each arm, a link connected between said arms so that said arms are arranged to simultaneously move toward each other or away from each other when one of said arms is pivoted, a cam follower on one of said arms, a fixed cam mounted adjacent said mounting member and having one camming surface in engagement with said cam follower for controlling pivoting movement of said arms during rotation of said mounting member, and another camming surface on said fixed cam for rotating said gripping heads during transfer of the fruit.

7. Apparatus for transferring fruit from a conveyor to an elevated processing machine comprising a turret rotatable about a horizontal axis, a pair of gripper support arms pivotally mounted on said turret for movement in a plane generally parallel to said axis, a horizontal shaft journalled for rotation in the end of each arm, a gripper head secured to said shaft, means for swinging said arms toward each other at a first angular position of said turret during rotation thereof to cause said gripper heads to close on and grip a fruit, means for swinging said arms away from each other to separate said gripper heads at a second angular position of said turret, a lever connected to each of said shafts, a cam follower secured to each lever, a cam mounted in fixed position adjacent each cam follower and having a closed cam track arranged to be engaged by the adjacent follower during rotation of said turret, said tracks being constructed to cause said gripper heads to rotate through a predetermined angular increment during movement of said turret between said first and second angular positions.

8. Apparatus for transferring fruit from a conveyor to an elevated processing machine comprising a mounting member rotatable about a horizontal axis and having a plurality of radially projecting flanges, a pair of gripper support arms pivotally mounted on each flange for movement toward and away from each other, a rotatable fruit gripper head on each arm in opposed relation to a head on the associated arm, a spring connected between said arms for swinging said arms toward each other to bring said gripper heads into engagement with a fruit on the conveyor, a link interconnecting said arms so that said arms swing simultaneously toward or away from each other, a cam follower on one of said arms, a stationary cam mounted adjacent the path of movement of said follower to be engaged thereby to swing said arms away from each other during a portion of the rotary movement of said mounting member, said follower being movable out of engagement with said cam during another portion of said rotation to permit said spring to swing said arms toward each other to grip a fruit on the conveyor, and means for rotating such opposed gripper heads while a fruit is being transferred from the conveyor to the processing machine so that the fruit is presented thereto in a desired orientation.

9. Apparatus for transferring fruit from a conveyor to an elevated processing machine comprising a mounting member rotatable about a horizontal axis and having a plurality of radially projecting flanges, a pair of gripper support members pivotally mounted on each flange, a rotatable fruit gripper head mounted on each member of each pair in opposed relation to a gripper head on the other member of the pair, means for rotating said mounting member, stationary cam means mounted adjacent the path of movement of said gripper support member, cam follower means operatively connected to said gripper support members and disposed in engagement with said cam to be moved thereby for controlling the movement of said gripper support members relative to each other, and a cam surface engageable by a follower connected to said gripper heads for rotating said gripper heads during a portion of a complete orbit of said support members.

References Cited by the Examiner
UNITED STATES PATENTS

| | | | |
|---|---|---|---|
| 2,112,119 | 3/1938 | Rowe | 198—210 X |
| 2,415,997 | 2/1947 | Eldred | 214—1 |
| 2,609,946 | 9/1952 | Brager et al. | 198—25 X |
| 2,969,867 | 1/1961 | McClelland | 198—33.1 |
| 3,118,530 | 1/1964 | Harrer et al. | 198—33.1 |
| 3,208,579 | 9/1965 | Perrier et al. | 198—33.3 |

EVON C. BLUNK, *Primary Examiner.*

R. WALKER, *Assistant Examiner.*

UNITED STATES PATENT OFFICE
CERTIFICATE OF CORRECTION

Patent No. 3,269,515                              August 30, 1966

Lindsay Greig Hill

It is hereby certified that error appears in the above numbered patent requiring correction and that the said Letters Patent should read as corrected below.

Column 4, line 6, for "incllined" read -- inclined --; column 5, line 70, for "head" read -- heads --.

Signed and sealed this 7th day of November 1967.

(SEAL)

Attest:

Edward M. Fletcher, Jr.

Attesting Officer

EDWARD J. BRENNER

Commissioner of Patents